United States Patent [19]

Loustaunau

[11] Patent Number: 5,460,117
[45] Date of Patent: Oct. 24, 1995

[54] TEMPERATURE INDICATOR FOR REFRIGERATED PRODUCTS

[76] Inventor: Albert Loustaunau, 12 Bd. Georges-Clemenceau, Draguignan, France, 83300

[21] Appl. No.: 244,042

[22] PCT Filed: Dec. 3, 1992

[86] PCT No.: PCT/FR92/01138

§ 371 Date: May 20, 1994

§ 102(e) Date: May 20, 1994

[87] PCT Pub. No.: WO93/11411

PCT Pub. Date: Jun. 10, 1993

[30] Foreign Application Priority Data

Dec. 5, 1991 [FR] France .................................... 91 15395

[51] Int. Cl.$^6$ .................................................. G01K 11/06
[52] U.S. Cl. .............................................. 116/218; 426/88
[58] Field of Search ................................ 374/106; 426/88; 116/216, 217, 218, 281, 283

[56] References Cited

U.S. PATENT DOCUMENTS 2,915,405  12/1959  Hammond, Jr. et al. ............... 116/218
4,999,615  3/1991   Toupin et al. ........................... 340/590

FOREIGN PATENT DOCUMENTS 0391782  10/1990  European Pat. Off. .
2100043  3/1972   France ................................... 116/218
2632405  8/1989   France .
2626668  8/1989   France .
9008518  6/1990   France .
2665957  3/1994   France .
2119511  11/1983  United Kingdom ................... 116/216

Primary Examiner—Andres Kashnikow
Assistant Examiner—Willie Morris Worth
Attorney, Agent, or Firm—Sandler, Greenblum & Bernstein

[57] ABSTRACT

Temperature indicator for refrigerated products operating on the principal of solidification and melting of liquid bodies at room temperature is provided with a transparent envelope containing a capsule filled with an aqueous solution which is liquid at room temperature. The capsule includes a fracture point causing it to split into two parts due to solidification of the solution, and further includes a compressed spring positioned so that when the capsule is fractured, the spring remains compressed as long as the solution is in the solid state, and visibly and irreversibly separates the two parts of the capsule if the solution turns to a liquid. The monitoring device serves to verify that the temperature is maintained either between two limits or below or above a critical temperature.

11 Claims, 1 Drawing Sheet

TEMPERATURE INDICATOR FOR REFRIGERATED PRODUCTS

BACKGROUND OF THE INVENTION

1. Field of the Invention

The present invention pertains to a temperature indicator for refrigerated products, using the solidification and melting of liquid bodies at room temperature.

More specifically, the present invention relates to the verification that the temperature is maintained either between two limits or below or above a critical temperature, and it is especially designed to verify that fresh or frozen products have not spoiled unbeknownst to the users, as the result of a power failure or malfunction of the cooling circuits of the refrigerated transport or preservation enclosure. The present invention mainly relates to food products, but may also be used in any situation where a storage temperature must be maintained, for example, for pharmaceutical products, or unstable products such as paints, adhesives, etc.

2. Discussion of Background Information

Frozen or deep-frozen food products must be preserved at a temperature remaining permanently below a determined temperature. For fresh products, transport and preservation must take place at a temperature comprised between zero and seven degrees or less, and must not rise above or below these values. However, a substantial temperature variation may occur accidentally, without warning to the product distributor or consumer in the case where the temperature comes back to a correct value during verification. The problem is all the more difficult to resolve because the products are often displayed in glass cases and are accessible to the buyer who may touch them, remove them from the refrigerated enclosure, and return them after having examined them.

Similarly, at several instances during their transport, the products pass outside of the cold preservation or transport enclosures, at temperatures that are difficult to control.

These considerations clearly indicate that a temperature monitor limited to cold transport, storage or display enclosures is inadequate. In order for this monitor to be efficient, the crossing of allowable temperature limits inside any individual packaging must appear by means of an easily visible sign, which remains after the temperature is back within the authorized limits. To date, devices enabling detection of such a temperature variation are either costly electronic alarm systems intended only for substantial installations, or monitors affixed to the product packaging that change color when the temperature rises, and are influenced especially by the temperature of the enclosure.

At the present time, these indicators are not widely distributed, and to our knowledge, there is no efficient and inexpensive means enabling detection of a dangerous temperature variation, especially between two values.

A certain number of patents, and specifically FR 90 08 518 and FR 90 10 498 (published as French Patent Document No. 2,665,957), by the same inventor, suggest using monitors constituted of capsules containing an aqueous solution whose freezing or thawing causes a visible, irreversible phenomenon so as to determine that a critical temperature has been crossed, upwards or downwards. These devices, although they resolve the problem of production cost, suffer from a serious disadvantage prohibiting their development in practice. In particular they must be conditioned or "stimulated" before or after freezing the product to be preserved, which not only requires handling that is difficult to imagine for large production quantities, but limits monitoring reliability, especially in the case where this stimulation is reversible.

SUMMARY OF THE INVENTION

The device according to the present invention proposes to overcome the above noted disadvantages. Indeed, for a very low cost, the temperature indicator according to the present invention enables totally reliable detection of an increase or decrease in the temperature of the product itself, beyond the upper or lower limits, even if the temperature has returned to a correct value at the time of monitoring, and this with automatic stimulation of the indicator, visually verifiable and irreversible.

The temperature indicator is constituted by the combination of an entirely or partially transparent envelope containing a capsule filled with an aqueous solution, liquid at room temperature, and comprising a peripheral fracture point causing its separation into two parts under the effect of solidification of the solution, the capsule contains a compressed spring arranged such that when the capsule is broken along the fracture point, the spring remains compressed as long as the solution is in the solid state, and cleanly, visibly and irreversibly separates the two parts of the capsule from one another when the solution liquefies.

BRIEF DESCRIPTION OF THE DRAWINGS

In the annexed schematic drawings, provided as non-limiting embodiment examples of the object of the invention.

DETAILED DESCRIPTION OF THE PREFERRED EMBODIMENTS

The device, FIGS. 1 to 4, is a temperature indicator constituted of a capsule 1 filled entirely with a preferably aqueous solution 2, liquid at storage room temperature and increasing in volume during its solidification, the solution being mixed with one or more additives fixing its fusion point at a value depending upon the critical temperature to be monitored.

Capsule 1 is provided with a peripheral fracture point 3 enabling its separation into two predetermined parts 4, 5 when the volume of solution 2 contained therein increases under the effect of the solidification caused by the decrease in temperature taking place during refrigeration or freezing of the product to be monitored.

This fracture of the capsule, possibly shown by the coloring of solution 2, enables verification that the required refrigeration temperature was properly attained, and constitutes an automatic and irreversible stimulation of the monitoring process. Indeed, the indicator can be stored at room temperature as long as is necessary, and does not require any handling in order to be actuated, which enables it to be incorporated into the refrigerated product packaging during production of the latter.

Figure 1:
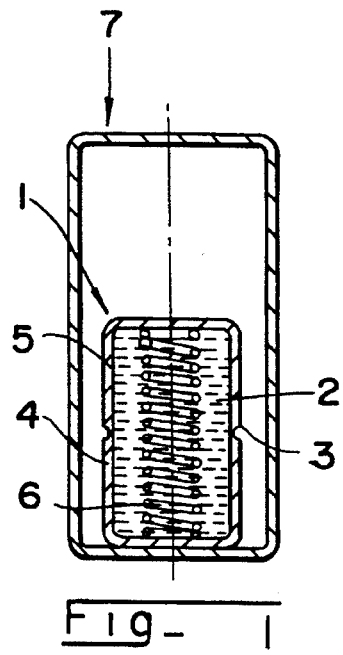
FIG. 1 represents an axial section of the device as it is stored before usage.
Figure 2:
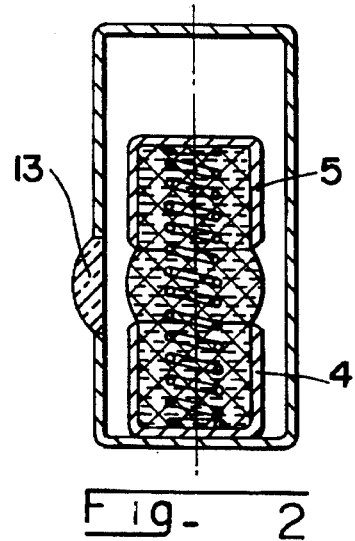
FIG. 2 shows the stimulated device under the same conditions, the decrease in temperature owing to freezing having solidified the solution and caused separation of the capsule into two parts.
Figure 3:
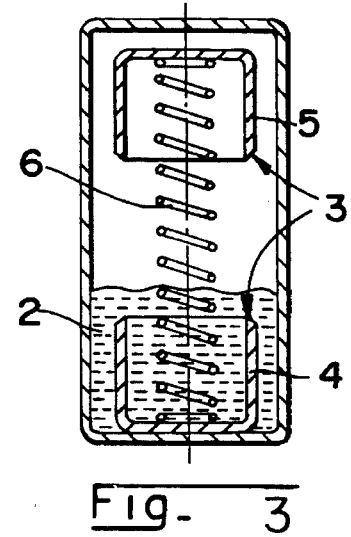
FIG. 3 represents the indicator after an increase in temperature having caused fusion of the solution, thus releasing the spring which very visibly separates the two parts of the capsule.

A compressed spring or elastic element 6 is enclosed in capsule 1, and arranged such that when it is broken along fracture point 3, it remains compressed as long as solution 2 is in the solid state, but expands visibly and irreversibly in case of liquefaction of the solution. This expansion may be utilized advantageously to cleanly separate from one another the two predetermined parts 4, 5 of the capsule, which enables the phenomenon to be rendered more visible (FIG. 3).

In order to avoid solution 2 from escaping, capsule 1 is contained in a totally or partially transparent envelope 7, affixed to the product to be verified, within its packaging or the refrigerated enclosure containing it, to prevent handling of the temperature indicator while enabling its observation.

Figure 4:
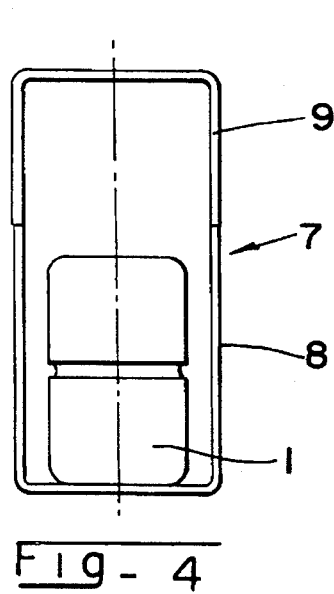
In FIG. 4, the indicator envelope is partially opaque, so as to allow the capsule to appear only in case of fusion of the solution.

In FIG. 4, one of the predetermined parts 4 is affixed to envelope 7, which comprises an opaque portion 8 masking the capsule as long as solution 2 is not liquified, and a transparent portion 9 enabling the second predetermined part 5 to be seen when the latter is separated by elastic element 6 after fusion of solution 2.

Envelope 7 may be equipped with a magnifier 13 located at the level of fracture point 3 and enabling verification that stimulation of the process was properly produced and that consequently, the refrigeration temperature was properly attained.

Figure 5:
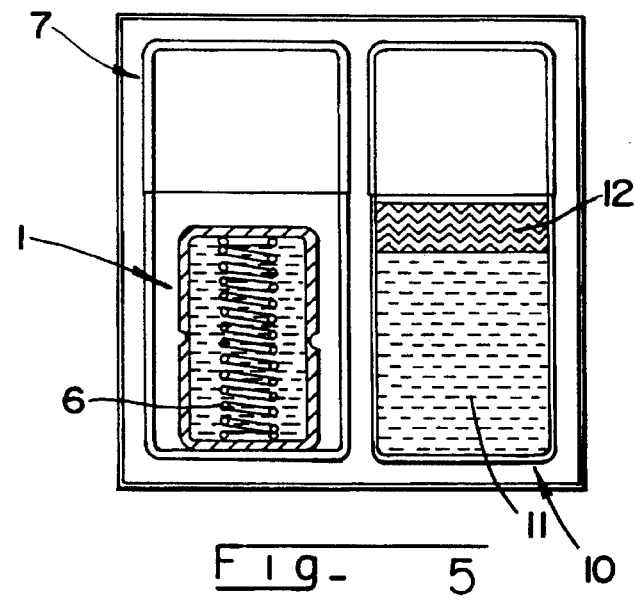
FIG. 5 shows a variation in which a low temperature monitor is connected to the indicator, the assembly being intended for monitoring non-frozen fresh products.

For monitoring fresh products, one can connect a low temperature indicator 10 to capsule 1, containing a liquid 11, which solidifies while causing a visible and irreversible phenomenon when the temperature goes below a low critical temperature, generally in the vicinity of 0° C. (FIG. 5). In this case, the solidification temperature of solution 2 contained in capsule 1 is, of course, lower than that of liquid 11.

The visible irreversible phenomenon may consist of the displacement of a reference element 12 caused by the increase in volume of liquid 11, this displacement being amplified advantageously by a spring, maintained compressed, and released by the solidification of liquid 11 by means of an escapement or gate system.

The displacement of the various indicator elements caused by crossing a critical temperature can be advantageously used for modifying the state of an electric contactor controlling a sonar or visual alarm or registration of the occurrence.

The positioning of the various component elements provides the object of the invention with a maximum of useful effects which, to date, have not been obtained by similar devices.

We claim:

1. Temperature indicator for refrigerated products, using solidification and melting of liquids, for monitoring a temperature, comprising:

a solution which is liquid at room temperature and increases in volume during solidification, said solution including at least one additive to set a melting point of said solution at a value depending upon a temperature to be monitored;

a capsule comprising a peripheral fracture point, said liquid entirely filling said capsule and causing separation of said capsule into two predetermined parts under effect of solidification of said solution; and an elastic element within said capsule, said elastic element being arranged in a compressed state so that, when said capsule is separated, said elastic element remains in a compressed state as long as said solution remains under solidification, and said elastic element irreversibly expanding upon melting of said solution to an expanded condition to separate said capsule parts so as to be visible between the parts in the expanded condition.

2. The temperature indicator according to claim 1, wherein, upon melting of said solution, said elastic element expands to ensure visible and irreversible separation of said two predetermined parts of said capsule from each another.

3. The temperature indicator according to claim 1, wherein said capsule is enclosed in an at least partially transparent external envelope, to enable observation of the capsule while preventing handling of the capsule.

4. The temperature indicator according to claim 3, wherein said envelope is capable of being affixed to a product to be monitored.

5. The temperature indicator according to claim 2, wherein said capsule is enclosed in an at least partially transparent external envelope, to enable observation of the capsule while preventing handling of the capsule.

6. The temperature indicator according to claim 5, wherein said two predetermined parts of said capsule comprise a first part and a second part, and said first part is affixed to said envelope, said envelope comprises an opaque portion masking said capsule as long as said solution is solidified and a transparent portion enabling the second part to be observed when separated by said elastic element upon melting of said solution.

7. The temperature indicator according to claim 5, comprising a magnifier on said envelope associated with said fracture point to enable observation of said fracture point.

8. The temperature indicator according to claim 1, wherein said elastic element comprises a spring.

9. Temperature indicator for refrigerated products, comprising:

a solution which is liquid at room temperature and increases in volume during solidification, said solution including at least one additive to set a melting point of said solution at a value depending upon a temperature to be monitored;

a capsule comprising a peripheral fracture point, said liquid entirely filling said capsule and causing separation of said capsule into separate parts under effect of solidification of said solution; and an elastic element within said capsule, said elastic element being arranged in a compressed state so that, when said capsule is separated, said elastic element remains in a compressed state as long as said solution remains under solidification, and said elastic element irreversibly expanding upon melting of said solution to an expanded condition to visibly and irreversibly separate said capsule parts from one another.

10. The temperature indicator according to claim 9, wherein said capsule is enclosed in an at least partially transparent enclosed external envelope, to enable observation of said capsule while preventing handling of the capsule.

11. The temperature indicator according to claim 10, wherein said two predetermined parts of said capsule comprise a first part and a second part, and said first part is affixed to said envelope, said envelope comprises an opaque portion masking said capsule as long as said solution is solidified and a transparent portion enabling the second part to be observed when separated by said elastic element upon melting of said solution.

* * * * *